United States Patent
Nir-Buchbinder et al.

(10) Patent No.: US 8,607,198 B2
(45) Date of Patent: Dec. 10, 2013

(54) CROSS-CONCERN CODE COVERAGE ASSESSMENT

(75) Inventors: Yarden Nir-Buchbinder, Haifa (IL); Dan Pelleg, Haifa (IL); Orna Raz-Pelleg, Haifa (IL); Shmuel Ur, Shorashim (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 947 days.

(21) Appl. No.: 12/636,853

(22) Filed: Dec. 14, 2009

(65) Prior Publication Data

US 2010/0262866 A1     Oct. 14, 2010

Related U.S. Application Data

(63) Continuation-in-part of application No. 12/144,666, filed on Jun. 24, 2008, now Pat. No. 8,006,138.

(51) Int. Cl.
*G06F 9/44* (2006.01)

(52) U.S. Cl.
USPC .......................................... 717/124; 717/131

(58) Field of Classification Search
None
See application file for complete search history.

(56) References Cited

U.S. PATENT DOCUMENTS

| | | | |
|---|---|---|---|
| 6,662,168 B1 | 12/2003 | Wallach | |
| 7,406,600 B2* | 7/2008 | Thomas et al. | 713/181 |
| 2007/0089091 A1* | 4/2007 | Larab et al. | 717/124 |
| 2009/0138843 A1* | 5/2009 | Hinton et al. | 717/101 |
| 2009/0144698 A1* | 6/2009 | Fanning et al. | 717/120 |

* cited by examiner

*Primary Examiner* — Kris Rhy
(74) *Attorney, Agent, or Firm* — Daniel Kligler

(57) ABSTRACT

A method for software processing includes extracting from software code under test respective items of meta-information pertaining to elements of the software code and receiving respective quality data regarding the elements of software code. The quality data and meta-information are processed in a computer so as to assign respective metrics to the items of the meta-information responsively to the quality data regarding the elements of the software code to which the items pertain. At least some of the meta-information is presented to a user in accordance with the assigned metrics.

24 Claims, 1 Drawing Sheet

CROSS-CONCERN CODE COVERAGE ASSESSMENT

CROSS-REFERENCE TO RELATED APPLICATION

This application is a continuation in part of U.S. patent application Ser. No. 12/144,666, filed Jun. 24, 2008 now U.S. Pat. No. 8,006,138, which is assigned to the assignee of the present patent application and whose disclosure is incorporated herein by reference.

BACKGROUND

The present invention relates generally to computer software, and particularly to methods and systems for assessing the quality of software code.

Software code is commonly tested for faults ("bugs") by subjecting the code to a set of test cases, which is referred to as a test suite. It is often of interest to assess the quality of the software code, such as by assessing the coverage or other quality measure of the test suite, and/or by analyzing known faults in the code.

BRIEF SUMMARY

An embodiment of the present invention provides a method for software processing includes extracting from software code under test respective items of meta-information pertaining to elements of the software code and receiving respective quality data regarding the elements of software code. The quality data and meta-information are processed in a computer so as to assign respective metrics to the items of the meta-information responsively to the quality data regarding the elements of the software code to which the items pertain. At least some of the meta-information is presented to a user in accordance with the assigned metrics.

Other embodiments provide apparatus and computer software products that operate on similar principles.

The present invention will be more fully understood from the following detailed description of the embodiments thereof, taken together with the drawings in which:

DETAILED DESCRIPTION

Overview

Figure 1:
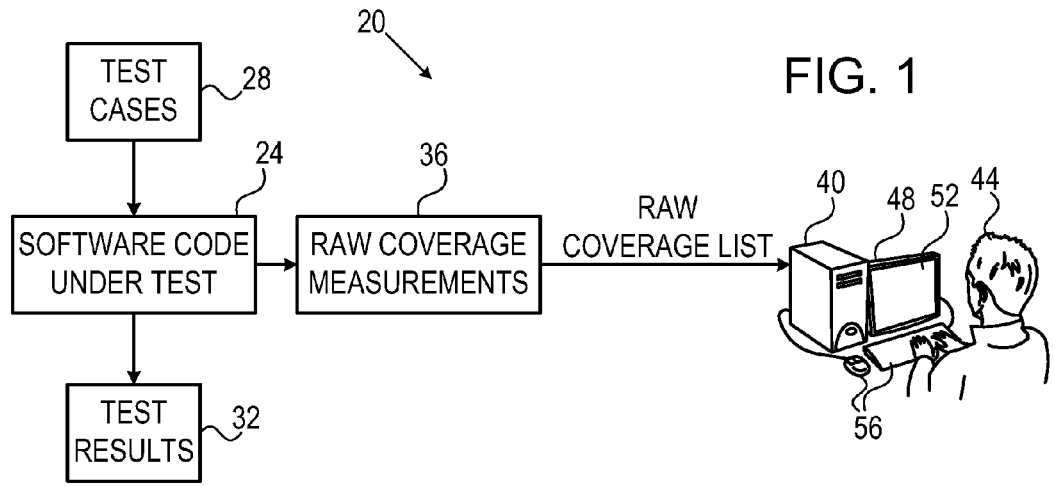
FIG. 1 is a block diagram that schematically illustrates a system for software testing, in accordance with an embodiment of the present invention.

Software quality assessment methods typically measure the quality of individual code elements such as files, classes, functions or basic blocks. For example, coverage assessment methods typically measure and present test coverage of individual code elements. Known methods of coverage assessment usually organize and present the coverage information in accordance with the hierarchical structure of the code itself.

In many cases, however, this type of information presentation does not provide correct focus on potential areas of concern and may miss important fault patterns. For example, some software faults are not related to specific code elements or to the hierarchical structure of the code, but rather to bug patterns or execution paths through the software that cut across multiple elements. Such faults are referred to herein as "cross-concern" faults, and coverage of faults of this type is referred to as cross-concern coverage. In complex software code, coverage information on individual code elements may well comprise millions of data records. Raw data of this magnitude is all but impossible for a human user, or even a group of users, to comprehend and analyze. There is therefore a need for automated tools that can help to detect and highlight cross-concern coverage issues.

The above-mentioned U.S. patent application Ser. No. 12/144,666 describes a method for assessing the quality of software code based on semantic similarities between code elements, rather than on the hierarchical structure of the code. Semantic similarities between code elements are determined by analyzing the names of the elements and identifying substrings that are common to multiple names. Quality data are aggregated and presented per substring rather than per code element.

Names of code elements are one type of meta-information that can be associated with the elements. In the context of the present patent application and in the claims, meta-information means information about an element of the software code (such as a function or basic block), as opposed to the code itself that is contained in the element. Other items of meta-information regarding a given code element may include, for example:

Hierarchy information
Inheritance information
Variables in the scope of the code element
Synchronization status of the code element
Exception used in the code element
Comment text associated with the code element
Version control information.

Not all code elements have meta-information of all these types. For instance, basic blocks are identified by their respective locations in the code and do not generally have meaningful names.

In some embodiments that are described hereinbelow, a coverage processor receives raw coverage data with regard to software code under test from a coverage measurement system. The raw coverage information typically comprises a list of elements of the code (such as functions, files and/or basic blocks) and corresponding coverage data that indicate whether or not (and possibly the number of times) each element was covered by running a given test suite.

The coverage processor processes the software under test in order extract specified items of meta-information that pertain to the elements of the code. The processor then assigns respective metrics to the meta-information items. The metric of any given item is computed based on the coverage data regarding the code elements to which the item pertains. For example, the metric of a given exception may be based on the number of times the exception occurred in code elements of the software and the number of these elements that were classified as "covered" in the raw coverage information.

The coverage processor presents a list of the meta-information items to the user in accordance with the assigned metrics. Typically, poorly-covered items are presented with highest priority so as to draw attention to semantic contexts that lack coverage.

Since the methods and systems described herein aggregate and prioritize coverage data based on meta-information rather than code structure, they are able to identify poorly-covered cross-concern areas of the code and reveal bug patterns that are undetectable by known methods. The methods and systems described herein automatically identify pervasive code coverage holes, which often cut across the coverage data hierarchy. These methods and systems are thus highly effective for directing testing efforts to poorly-covered software paths and bug patterns.

Coverage is one type of software quality data. The methods and systems described herein can similarly be used to assess and present other aspects of software quality. For example, in alternative embodiments of the present invention, the number and/or types of detected software faults can be assessed and associated with specific meta-information features. Other quality measures, such as the effectiveness of a given testing phase in detecting faults, can also be assessed and aggregated according to the values of meta-information items.

System Description

The description that follows refers mainly to test coverage assessment. This choice is made, however, purely for the sake of conceptual clarity. The methods and systems described herein can be adapted, mutatis mutandis, to assess other types of quality measures, as well.

FIG. 1 is a block diagram that schematically illustrates a system 20 for software testing, in accordance with an embodiment of the present invention. System 20 tests software code 24 by subjecting the code to test cases 28. Code 24 may comprise source code, object code or any other suitable type of software code. The test procedure produces test results 32, which typically indicate identified faults and additional information for debugging purposes.

System 20 comprises a raw coverage measurement unit 36, which assesses the coverage achieved by test cases 28 and produces raw coverage information. The raw coverage information typically comprises a list of code elements and respective coverage data. The coverage data of a given code element typically comprises a Boolean flag indicating whether or not the element was covered by test cases 28. In alternative embodiments, however, the coverage data may provide quantitative measures of coverage or lack of coverage and/or any other information that is indicative of coverage of the code element.

In the context of the present patent application and in the claims, the terms "code element" and "element of the code" refer to any identifiable partition of the software code, such as files, functions, basic blocks, objects (e.g., classes in an object-oriented code) and/or variables, for example. In this context, a basic block is a set of one or more lines of code that has one entry point and one exit point and contains no jump instructions. The basic blocks in a program correspond to the nodes in the control flow graph of the program. Basic blocks can be identified automatically by compilers that are known in the art. The partitioning of the software code into basic blocks or other elements may have any desired granularity. As can be appreciated, the raw coverage information may well reach millions of elements.

The raw coverage information is provided by raw coverage measurement unit 36 to a coverage processor 40, which carries out the methods described herein. Processor 40 typically comprises a general-purpose computer, which is programmed in software to carry out the functions that are described herein. The software may be provided to the processor in electronic form, over a network, for example, or it may, alternatively or additionally, be stored in a tangible computer-readable storage medium, such as optical, magnetic, or electronic memory media. Alternatively or additionally, the processor may comprise dedicated or programmable hardware circuits for carrying out at least some of the described functions.

Processor 40 processes the software code under test to identify code elements of a specified type or types, and to extract meta-information pertaining to these code elements. The processor then assigns respective metrics to the items of meta-information. The metric of a given item is computed based on the coverage data of the code elements to which the item pertains. The coverage processor presents a list 52 of items of meta-information to a user 44 on an output device 48, such as a computer display. The user may scroll or otherwise manipulate the presented list using an input device 56, such as a mouse or keyboard.

In some embodiments, the functions of two or more components of system 20 may be carried out by a single processor. For example, the functions of processor 40 and unit 36 may be carried out by a single workstation, possibly together with a test generation unit that produces test cases 28. The test generation unit may automatically generate new tests based on the cross-concern coverage analysis performed by processor. Alternatively or additionally, user 44 may direct the generation of these new tests. Unit 36 typically collects and stores the raw coverage information as part of the test procedure. Following the test procedure, the raw coverage information is retrieved and analyzed by processor 40, either on the same computer used for running the tests or on a different computer. Alternatively, any other suitable configuration or division of functions among different computers can be used.

Software Quality Assessment Using Meta-Information Analysis

In many practical cases, some error events and bug patterns may not be identifiable at the level of individual code elements. For example, a particular user input may trigger an execution path that involves multiple code elements responsible for Input/Output (I/O) error handling. If, however, this particular user input is not applied by the test suite, the error handling execution path will not be taken, and the code elements participating in this path may not be covered. Such insight ("error handling execution paths are poorly-covered") will not be gained by examining the coverage of individual code elements, because it is based on the semantic similarity between the poorly-covered elements (which all have to do with I/O error handling) and not on the hierarchical structure of the code. The methods and systems described herein identify such semantic similarities by identifying similarities in the meta-information of different code elements, which may be spread widely across the code under test.

As noted above, coverage processor 40 generates meta-information pertaining to code elements identified in the raw coverage information. In the above-mentioned parent patent application, U.S. patent application Ser. No. 12/144,666, the coverage processor generates and processes substrings that occur in the element names. Alternatively, in the embodiments that are described hereinbelow, processor 40 extracts other types of meta-information from the code elements, including the examples shown in the table below:

TABLE I

TYPES OF META - INFORMATION

| Type | Specified items |
|---|---|
| Name | Substrings (but note that basic blocks generally have no meaningful names) |
| Hierarchy | Level of the element in hierarchical specification or decomposition of the program |
| Inheritance | Identification of the parent and/or child class |

TABLE I-continued

TYPES OF META - INFORMATION

| Type | Specified items |
|---|---|
| Variables | Names of variables occurring in the element |
| Synchronization | Is the element subject to a synchronization command in the program |
| Exception | Name(s) of exceptions called in the element |
| Comments | Substrings (and possibly other characteristics) occurring in comment text occurring in or associated with the element |
| Version control | Version number or date of latest update of this element |
| Return codes | Attributes associated with code elements in previous executions |

Other types of meta-information, as well as combinations of different types, may also be used in the analysis. Although substring-based analysis is noted explicitly in the above table only with respect to "names" and "comments," such substring analysis may similarly be applied to the other types of meta-information. Processor 40 may use any suitable logic or criterion for choosing and sorting the meta-information items that are to be used in each case.

Processor 40 maintains one or more counters for each item. The counters of a given item accumulate coverage data from the raw coverage information that is associated with code elements to which the meta-information item pertains. For example, processor 40 may count the number of code elements in which the exception "IoError" occurs or in which the global variable "X" occurs and may count the number of these elements that were classified as "covered" in the raw coverage information. Additionally or alternatively, processor 40 may count the number of code elements in which a given item occurs and which were classified as "uncovered." Processor 40 typically maintains a data structure that stores the counters corresponding to the different meta-information items of interest. This functionality may be carried out, for example, by a hash table.

Various criteria can be used for classifying code elements as "covered" or "uncovered." In some embodiments, code elements that were covered at least once by the test suite are classified as "covered," and code elements that were not covered at all are classified as "uncovered." In alternative embodiments, however, softer criteria can be used to determine whether code elements are adequately covered or not, and to classify them as "covered" or "uncovered" accordingly. For example, code elements that were covered less than a predefined number of times may be regarded as "uncovered." Further alternatively, any other suitable logic or criteria defined over the coverage indications can be used for classifying code elements as "covered" or "uncovered." In other words, code elements can be classified as "uncovered" if they are not sufficiently covered to meet a given criterion, and vice versa.

In some embodiments, the coverage data may comprise quality indications that take into account the presence of faults in the respective code elements. In these embodiments, a given code element can be classified as "uncovered" if it was covered but was found to contain a bug. Similarly, a code element can be classified as "covered" if it was covered by the test suite and found not to contain a bug. Additionally or alternatively, any other suitable criterion can be used for classifying code elements as "covered" or "uncovered" based on indications that specify the presence or absence of faults. (When generalizing the method to various other types of quality indications, the different code elements are classified as "acceptable" or "unacceptable.")

Coverage processor 40 computes a coverage metric for each meta-information item in a specified set based on the counter values accumulated for the item. In some embodiments, the metric is defined so that high metric values indicate well-covered items, and vice versa. In alternative embodiments, however, an opposite convention can be used so that high metric values indicate poorly-covered items.

For example, the processor may compute a relation between the number of "covered" occurrences and the number of "uncovered" occurrences of a given item of meta-information, such as the natural logarithm of the ratio between "covered" and "uncovered" occurrences. This sort of metric is referred to herein as a coverage quotient. If no "covered" occurrences are found, the metric is set to −1000. If there are no "uncovered" occurrences, the metric is set to +1000.

As another example, the metric may comprise a relation between the number of "covered" or "uncovered" occurrences and the total number of occurrences. For instance, the metric may comprise the ratio between the number of "covered" occurrences and the square root of the total number of occurrences. In alternative embodiments, processor 40 may compute any other suitable metric.

Processor 40 presents the list of meta-information items to user 44 using output device 48. The list is sorted and presented in accordance with the metric values of the items. The list is typically sorted so that poorly-covered items are presented first, thus drawing attention to the poorly-covered items. In alternative embodiments, the processor may sort the items by the total number of occurrences.

In some embodiments, processor 40 filters the set of items of meta-information and presents only a subset of the items to the user. For example, the processor may filter out items whose number of occurrences is smaller than a predefined threshold (such as items having fewer than ten occurrences). Additionally or alternatively, the processor may filter out items whose coverage quotient is smaller than a given threshold, for example, smaller than log(1/20). Further additionally or alternatively, the processor may use any other suitable criterion for filtering the items based on their metric values.

User 44 may perform various actions with respect to the software code based on the presented list of items and their coverage values. For example, the user may modify test cases 28 (such as adding, deleting or modifying test cases) and re-test the code using the modified test cases, in order to improve the coverage of code elements associated with the poorly-covered substrings.

In some embodiments, processor 40 extracts and considers only certain types and/or particular items of meta-information that are specified by user 44 or by a predefined test protocol. This technique enables the user to concentrate on specific aspects of the software code, and to direct the coverage assessment process accordingly.

Additionally or alternatively, processor 40 may use a dictionary to expand the specified meta-information items and thus reveal larger coverage holes. For example, the dictionary may identify aliases of a specified variable, whereby a certain global variable is identified with an associated local variable that occurs inside a certain function or functions. As another example, the dictionary may identify common spelling variations, such as British versus American spellings.

Coverage Assessment Method Description

Figure 2:
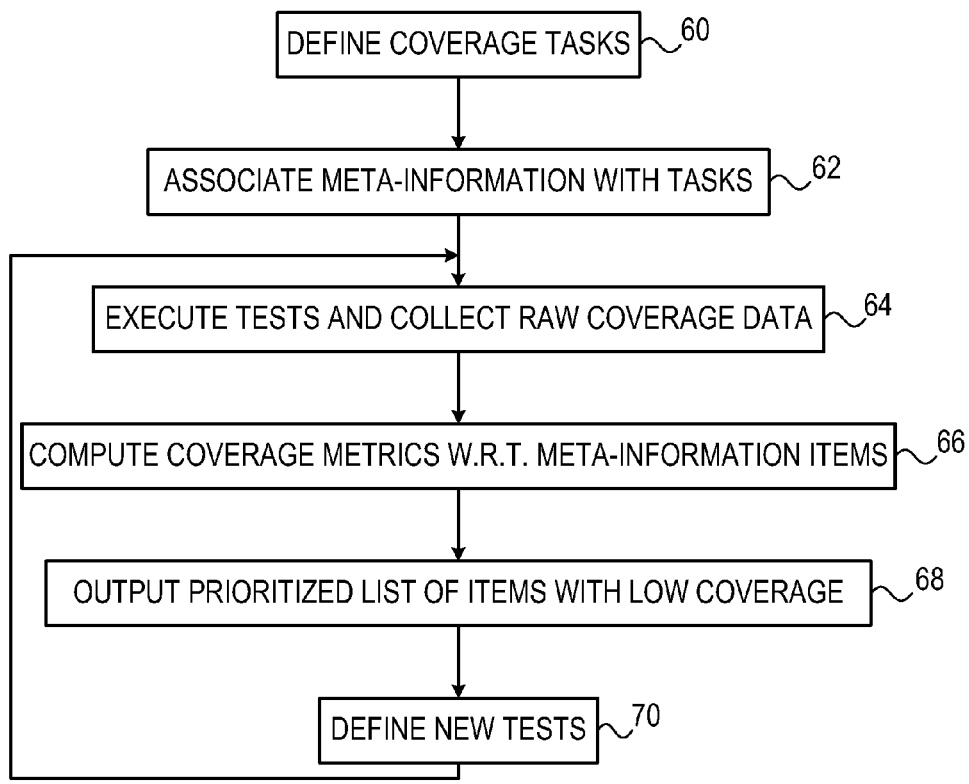
FIG. 2 is a flow chart that schematically illustrates a method for assessing software test coverage, in accordance with an embodiment of the present invention.

FIG. 2 is a flow chart that schematically illustrates a method for assessing software test coverage, in accordance with an embodiment of the present invention. In the present example, the code elements comprise basic blocks, although other elements may be used alternatively or additionally.

User 44 initiates the method by inputting at least one coverage task definition to processor 40, at a task definition step 60. The processor identifies the meta-information that is associate with the task, at a meta-information association step 62. This step may be carried out entirely automatically or with guidance from the user. For example, the user may define a task as evaluating coverage of basic blocks that change the value of a certain variable or group of variables. The processor will then process the code (typically using static analysis) in order to identify the basic blocks that contain one or more of the specified variables in their scope, and possibly aliases of the variables, as well.

After running a given test suite, processor 40 receives raw coverage information 36 detailing the coverage of the different basic blocks in the software under test by the test suite, at an input step 64. The raw coverage information comprises a list of basic blocks and an indication of the corresponding coverage state of each block (i.e., whether the block was covered or uncovered, as given by a Boolean "covered"/"uncovered" flag, for example). The coverage processor counts "covered" and/or "uncovered" occurrences of the specified items of meta-information in the basic blocks in which the items occur. In the present example, for each variable, the processor counts the number of basic blocks containing the variable of interest that were covered by the test suite in question, and may also count the number of basic blocks containing the variable that were not covered by the test suite. The processor then computes a coverage metric for each item of meta-information (each variable in the present example) based on the "covered" and "uncovered" counter values for the item, at a metric computation step 66.

The coverage processor produces and outputs a list of the meta-information items, sorted in accordance with the metric values of the different items, at an output step 68. The processor displays the list to user 44 using output device 48.

The user may apply the insights provided by the prioritized list in defining new tests and/or coverage tasks to execute, at a test definition step 70. The method of FIG. 2 can thus be applied in a recursive manner, so as to refine the results and further identify semantic connections between code elements. In a typical recursive flow, when processor 40 produces and presents a sorted list of items of meta-information, the user selects a given poorly-covered item from the list. The coverage processor may then re-apply the coverage assessment methods described above to the code elements in which the item occurs. In this iteration, however, the processor considers only the code elements in which the selected meta-information item actually occurred.

In the example given above, the user may be presented with the insight that code elements related to a given variable lack sufficient coverage. In a large and complex system, however, it may be difficult for the user to translate this insight into additional test cases. Therefore, the user may wish to refine the analysis of code elements that are related to one of the variables by repeating the coverage analysis with respect to another variable or another type of meta-information. Various conditions and criteria (such as filtering or sorting criteria) may change from one iteration to another.

As another example, user 44 may specify at step 60 or step 70 that processor 40 is to check coverage of one or more exceptions that may occur in the program. (Try-catch methods may be applied to discover automatically which exception or exceptions are used in each code element.) In this case, processor 40 will count and compute coverage metrics for each possible exception and will then output a list of the exceptions, prioritized by coverage, at step 68.

Meta-information with respect to code elements may also be generated when the elements are executed during a test run of the software, and coverage of these items of meta-information may then be evaluated. One such type of meta-information, as noted above in Table I, is return codes. During an execution of a program, each function can return a number of different return codes, for example:

0—RC_SUCCESS
1—RC_NO_WRITE_PERMISSION
2—RC_NO_READ_PERMISSION
3—RC_FILE_LOCKED
77—RC_FILE_DOES_NOT_EXIST
99—RC_COMMUNICATION_ERROR

Processor 40 may record which return code or codes were returned by each function during a run of the software under test and then compute and use coverage metrics with respect to the different code values.

Additional Applications and Quality Measures

As noted above, the methods and systems described herein can be used to assess other quality indications regarding software code and to aggregate such indications based on shared meta-information between code elements. In general, a processor may accept quality information comprising an identification of elements (such as files, functions or basic blocks) of the software code and respective quality indications related to these code elements. The quality indication of a given code element is indicative of the acceptability of the element, as tested by a given test suite.

The processor extracts a list of meta-information items that are associated with the code elements, and assigns respective metrics to the items based on the quality indications of the code elements to which the items pertain. The processor then presents at least some of the meta-information items to a user, using an appropriate output device, in accordance with the assigned metrics.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described herein with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow charts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow charts and/or block diagram block or blocks.

The flow charts and block diagrams in the figures illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustrations, and combinations of blocks in the block diagrams and/or flow chart illustrations, can be implemented by special purpose hardware-based systems that perform the specified functions or acts, or combinations of special purpose hardware and computer instructions.

Although the embodiments described above mainly address assessing test coverage of software code that subsequently executes on a suitable processor, the methods and systems described herein can also be used for assessing test coverage of firmware code. The firmware code may be written in any suitable language, such as in C. In the context of the present patent application and in the claims, such code is also regarded as a sort of software code.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for software processing, comprising:
   extracting from software code under test respective items of meta-information pertaining to elements of the software code;
   receiving respective quality data regarding the elements of software code;
   processing the quality data and meta-information in a computer so as to assign respective metrics to the items of the meta-information responsively to the quality data regarding the elements of the software code to which the items pertain,
   wherein the meta-information is selected from a group of types of information consisting of inheritance information regarding the elements of the software code, a synchronization status of the elements of the software code, one or more exceptions that occur in the elements of the software code, comments associated with the elements of the software code, and version information associated with the elements of the software code; and
   presenting at least some of the meta-information to a user in accordance with the assigned metrics.

2. The method according to claim 1, wherein receiving the respective quality data comprises subjecting the code to one or more tests, and receiving results of the tests.

3. The method according to claim 2, wherein the method comprises defining one or more new tests responsively to the presented meta-information and metrics, and applying the new tests to the software code.

4. The method according to claim 1, wherein the quality data comprises coverage data, which are indicative of test coverage of the elements of the software code by a set of test cases.

5. The method according to claim 1, wherein processing the quality data and meta-information comprises assigning the metrics to basic blocks of the software code.

6. The method according to claim 1, wherein extracting the items of the meta-information comprises reading and processing respective names of the elements of the software code.

7. The method according to claim 1, wherein processing the quality data and meta-information comprises assigning the metrics with respect to hierarchy information regarding the elements of the software code.

8. The method according to claim 1, wherein processing the quality data and meta-information comprises assigning the metrics with respect to the inheritance information regarding the elements of the software code.

9. The method according to claim 1, wherein processing the quality data and meta-information comprises assigning the metrics with respect to one or more variables that occur in respective scopes of the elements of the software code.

10. The method according to claim 1, wherein processing the quality data and meta-information comprises assigning the metrics with respect to the synchronization status of the elements of the software code.

11. The method according to claim 1, wherein processing the quality data and meta-information comprises assigning the metrics with respect to the one or more exceptions that occur in the elements of the software code.

12. The method according to claim 1, wherein processing the quality data and meta-information comprises assigning the metrics with respect to the comments associated with the elements of the software code.

13. The method according to claim 1, wherein processing the quality data and meta-information comprises assigning the metrics with respect to the version information associated with the elements of the software code.

14. A method for software processing, comprising:
    extracting from software code under test respective items of meta-information pertaining to elements of the software code;
    receiving respective quality data regarding the elements of software code;
    processing the quality data and meta-information in a computer so as to assign respective metrics to the items of the meta-information responsively to the quality data regarding the elements of the software code to which the items pertain; and
    presenting at least some of the meta-information to a user in accordance with the assigned metrics,
    wherein the quality data comprises coverage data, which are indicative of test coverage of the elements of the software code by a set of test cases, and
    wherein processing the quality data and meta-information comprises:
    counting a number of the elements to which a given item of the meta-information pertains and which are indicated by the coverage data as belonging to a given coverage state after running the test cases; and
    computing a metric of the given item based on the number.

15. A method for software processing, comprising:
    extracting from software code under test respective items of meta-information pertaining to elements of the software code;
    receiving respective quality data regarding the elements of software code;
    processing the quality data and meta-information in a computer so as to assign respective metrics to the items of the meta-information responsively to the quality data regarding the elements of the software code to which the items pertain; and
    presenting at least some of the meta-information to a user in accordance with the assigned metrics,
    wherein the quality data comprises coverage data, which are indicative of test coverage of the elements of the software code by a set of test cases, and
    wherein presenting the at least some of the meta-information comprises ranking the items of the meta-information, based on the respective metrics, so as to give a high priority to the items having a low level of the test coverage.

16. A method for software processing, comprising:
    extracting from software code under test respective items of meta-information pertaining to elements of the software code;
    receiving respective quality data regarding the elements of software code;
    processing the quality data and meta-information in a computer so as to assign respective metrics to the items of the meta-information responsively to the quality data regarding the elements of the software code to which the items pertain; and
    presenting at least some of the meta-information to a user in accordance with the assigned metrics,
    wherein extracting the items of the meta-information comprises running the software code, and collecting the meta-information that is generated when the elements of the software code are executed.

17. The method according to claim 16, wherein collecting the meta-information comprises collecting return codes, and wherein processing the quality data and meta-information comprises assigning the metrics with respect to the return codes that are associated with the elements of the software code.

18. Apparatus for software processing, comprising:
    an output device; and
    a processor, which is configured to extract from software code under test respective items of meta-information pertaining to elements of the software code, to receive respective quality data regarding the elements of software code, to process the quality data and meta-information in a computer so as to assign respective metrics to the items of the meta-information responsively to the quality data regarding the elements of the software code to which the items pertain, and to present at least some of the meta-information on the output device in accordance with the assigned metrics,
    wherein the meta-information is selected from a group of types of information consisting of hierarchy information regarding the elements of the software code, inheritance information regarding the elements of the software code, a synchronization status of the elements of the software code, comments associated with the elements of the software code, version information associated with the elements of the software code, exceptions that occur in the elements of the software code, variables that occur in respective scopes of the elements of the software code, and return codes that are associated with the elements of the software code.

19. The apparatus according to claim 18, wherein the quality data is obtained by subjecting the code to one or more tests.

20. The apparatus according to claim 19, wherein the quality data comprises coverage data, which are indicative of test coverage of the elements of the software code by a set of test cases.

21. The apparatus according to claim 20, wherein the processor is configured to count a number of the elements to which a given item of the meta-information pertains and which are indicated by the coverage data as belonging to a given coverage state after running the test cases, and to compute a metric of the given item based on the number.

22. The apparatus according to claim 20, wherein the processor is configured to rank the items of the meta-information, based on the respective metrics, so as to give a high priority to the items having a low level of the test coverage.

23. The apparatus according to claim 18, wherein the processor is configured to assign the metrics to basic blocks of the software code.

24. A computer software product, comprising a tangible, non-transitory computer-readable medium in which program instructions are stored, which instructions, when read by a computer, cause the computer to accept quality information comprising names of elements of software code and respective quality indications regarding tested acceptability of the elements, to process the names so as to extract a list of substrings that occur in the names, to assign respective metrics to the substrings responsively to the quality indications of the elements in whose names the substrings occur, and to present at least some of the substrings to a user in accordance with the assigned metrics, wherein the meta-information is selected from a group of types of information consisting of hierarchy information regarding the elements of the software code, inheritance information regarding the elements of the software code, a synchronization status of the elements of the software code, comments associated with the elements of the software code, version information associated with the elements of the software code, exceptions that occur in the elements of the software code, variables that occur in respective scopes of the elements of the software code, and return codes that are associated with the elements of the software code.

* * * * *